May 31, 1932.  F. O. L. CHORLTON  1,861,080
FRICTIONAL PLATE CLUTCH
Filed April 17, 1930  2 Sheets-Sheet 1
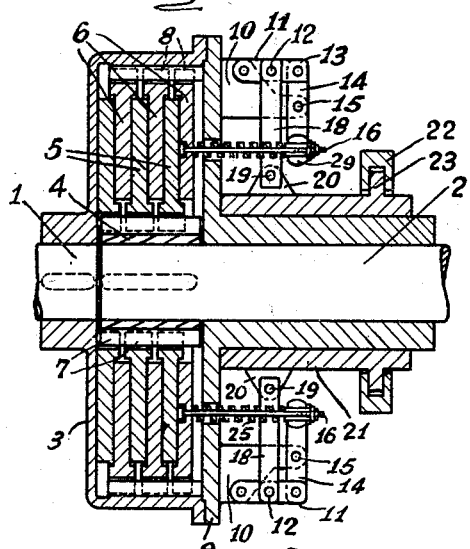
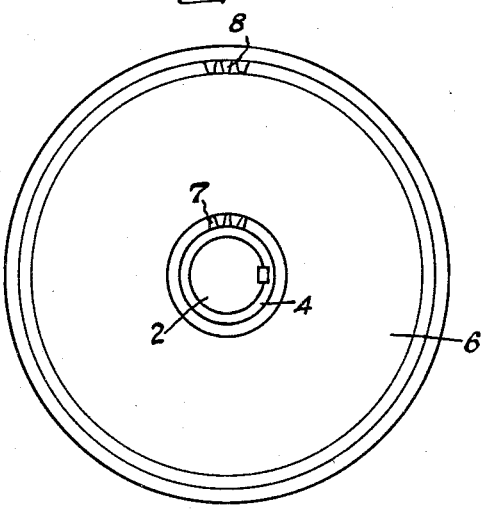
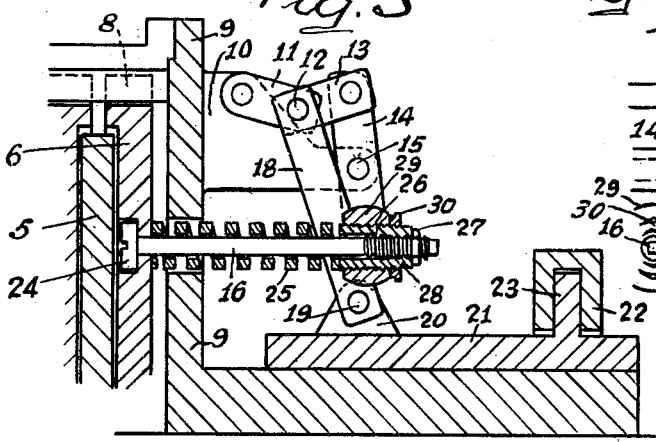
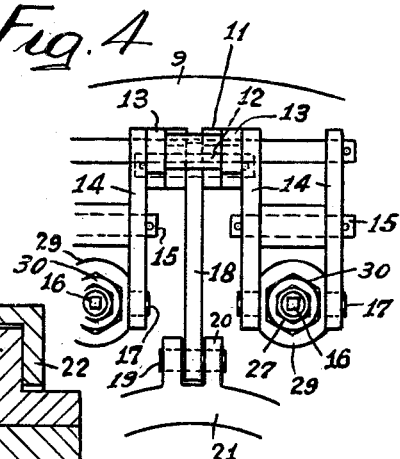
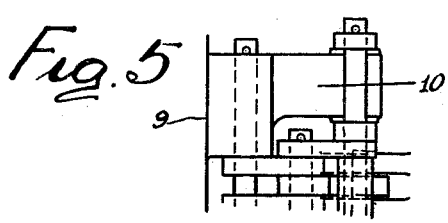
Inventor
Frank Oscar Levi Chorlton
per: Arthur Gadd,
Attorney.

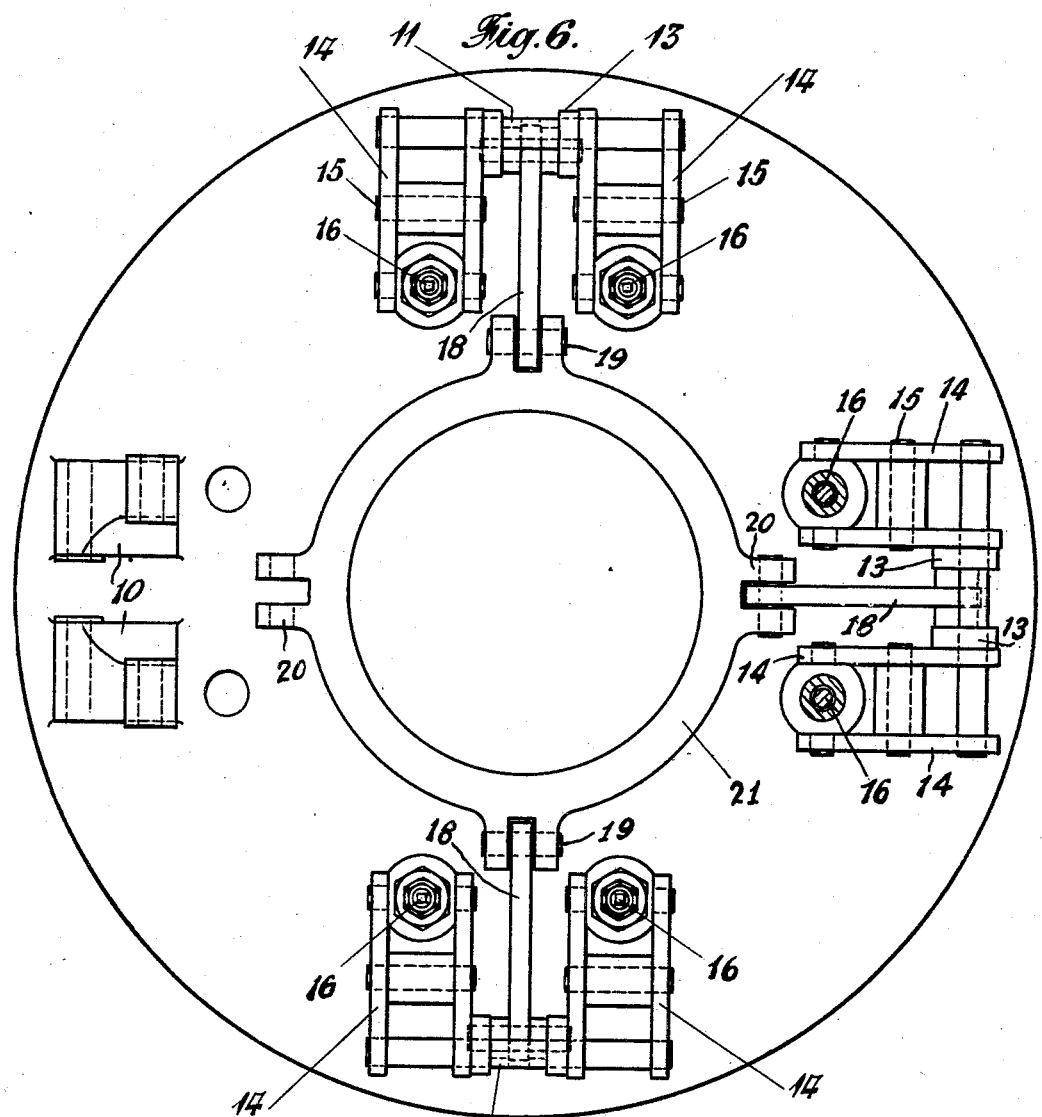
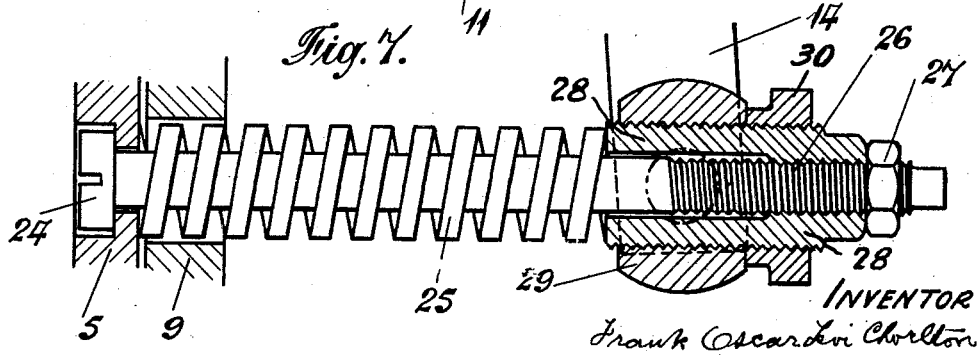

Patented May 31, 1932

1,861,080

UNITED STATES PATENT OFFICE

FRANK OSCAR LEVI CHORLTON, OF BURY, ENGLAND

FRICTIONAL-PLATE CLUTCH

Application filed April 17, 1930, Serial No. 445,098, and in Great Britain April 3, 1930.

The invention relates to clutches of the type employing alternately arranged driving and driven plates within a casing, the frictional contact between which plates operates to transmit motion from one to the other of a pair of shafts or revoluble parts involved.

In such types of clutches teeth are usually provided projecting from the inner circumferential parts of the casing attached to one of the shafts referred to, for contact with one set of plates employed, while similar teeth are provided on a boss or part about the other shaft concerned for contact with the alternate plates of the system.

The means provided according to my invention are for ensuring the pressure-contact between the plates for driving purposes being brought about in uniform and effective manner, as herein described.

In the accompanying drawings Fig. 1 is a sectional elevation showing a pair of shafts in line with each other connected together by means of a frictional-plate clutch of the tooth-engaging type.

Fig. 2 is a view at right angles to Fig. 1 showing parts only of the ones therein indicated.

Fig. 3 shows on an enlarged scale a portion of Fig. 1.

Fig. 4 is a view at right angles to Fig. 3 of parts thereof.

Fig. 5 is a plan view of a part of Fig. 3.

Fig. 6 is an enlarged and extended view of Fig. 4, showing repetitions of parts on said Fig. 4 as well as added parts.

Fig. 7 is an enlarged view of a portion of Fig. 3.

One of the shafts referred to is indicated at 1 (Fig. 1) and the other at 2 (Figs. 1 and 2).

A casing 3 is keyed to shaft 1, and a separate boss or part 4 is keyed to shaft 2. Within the casing plates 5 are mounted alternately with plates 6, face to face, the former plates being in engagement with boss 4 and the latter plates being in engagement with casing 3.

The plates 6 are formed with teeth 8 at the peripheral parts, and which engage corresponding teeth projecting inwardly and engaging with the former from the casing 3. On the other hand, the boss 4 is formed with teeth as described at 7, teeth being formed upon the corresponding circumferential parts of plates 5 for engaging the same. On removal of the cover plate 9 of the casing 3, all the plates 5 and 6 are capable of being withdrawn in the direction of the axis of the shafts shown. Similarly, the plates may be placed within the casing 3, in consecutive manner, the teeth on the plates taking naturally into the spaces between the teeth on the casing or on the boss referred to, as the case may be.

The means I employ for applying this pressure here consist of lugs or side brackets 10 (shown detached on Fig. 6) on the casing cover 9, on which are pivoted links 11 which are also connected at 12 to further links 13. In pivotal connection with the latter are pairs of arms 14, themselves in pivotal connection with the side brackets 10, at 15. The other ends of the arms 14 are in connection with a spring controlled rod 16 at the position marked 17. A further link 18 is connected at its upper end at 12 and at its lower end at 19 to a bracket or upright 20 upon a sleeve 21 riding upon the extended boss of the cover 9.

The sleeve 21 may be moved to the right or left according to its initial position, by the operation of a member 22 engaging a ring-like projection 23 on the sleeve 21. That is to say, when the member 22 is caused by the application of some external force to move the parts indicated from the positions shown in Fig. 3 to the positions shown in Fig. 1 not only is the spring 25 forced forward for pressing the plates 5 and 6 into close contact for frictional driving from one shaft to the other of the pair shown, but the action at the toggle joint formed by the links described, brings the links 11 and 13 into the locked position for retaining the pressure thus provided at the plates named. A reverse motion to that described releases the pressure as will be understood.

The pressure named is entirely applied through the springs such as 25, or when the engagement of the clutch takes place the first friction plate in Fig. 3 and adjacent to the end of the spring is advanced by said pressure and presses all the remaining plates together until the resistance exceeds the spring pressure, or equals it. The inner end of rod 16 is shown enlarged at 24, which enlarged end takes into a cavity formed in the end plate before-named, but said end of the rod does not press upon the end plate. On release of the clutch motion this head operates to help release the plates by bearing upon the one between it and the spring 25. It also prevents undue release of pressure on the said spring on said disengagement of the clutch.

The rod 16 is shown with an outer screw-threaded end 26 carrying a lock nut 27, which end also carries a barrel-like member 28 similarly threaded. This barrel has an external thread in addition for engagement with the piece 29 to which the arms 14 are connected as before-named. A lock nut is shown at 30.

When the latter is tightened and the lock nut 27 is released, the rod 16 may be turned by a screw key applied at the squared end of said rod shown, when adjustment longitudinally of the rod may be attained for regulating the compression of the spring. If however the nut 27 is tightened, and the one marked 30 is released, a similar action will result in the parts 16 and 28 turning as one solid, and the piece 29 moving, as well as parts of the toggle mechanism. From an inspection of Fig. 6 it will be seen that a number of links 18 along with the attendant links of the toggle system employed are provided at intervals around the cover of the casing, and therefore movement of the sleeve 21 will result in all the links being operated together and pressure applied at several points in the circle.

I claim:—

1. In frictional-plate clutches employed for transmitting motion from one shaft or revoluble part to another shaft or revoluble part, springs about longitudinally movable rods passing into the clutch casing, said springs in direct contact with the outermost plate of the series in the clutch, and said rods connected to a linkage system of the toggle class, whereby the rods and spring-pressed plates are locked in position for motion-transmission purposes, as herein set forth.

2. In frictional-plate clutches for transmitting motion from one shaft or revoluble part to another shaft or revoluble part, a boss with teeth around the same attached to one of the said shafts, a clutch casing with teeth internally around the same, and a series of plates with teeth around peripheries thereof for alternately engaging spaces between the teeth of the boss and casing aforesaid, within said casing, longitudinally movable rods passing into said casing, helical springs about said rods, said springs in direct contact with the outermost plate of the series in the clutch casing, said rods passing through said outermost plate, a clearance between the inner ends of said rods and the plate beyond, said rods screw-threaded at their outer ends, and provided with a lock nut in each case, and also provided with a barrel-like member in screw-thread connection with said rod in each case, and within the position of said lock nut, a piece in screw-thread connection with and about said barrel-like member, a lock nut for said piece toggle mechanism in connection with the casing, and an arm connecting said mechanism with the piece aforesaid, an operable sleeve and a link whereby said sleeve is connected to said toggle mechanism, said arm pivoted on the clutch casing and also to a link of the toggle mechanism, said lock nuts operable for adjustment through the rods of the springs about the same independently of the toggle mechanism, or, alternatively, for adjustment of the latter said sleeve operable for pulling the clutch in or out, as herein set forth.

FRANK OSCAR LEVI CHORLTON.